US007227974B2

(12) United States Patent
Kamijo et al.

(10) Patent No.: US 7,227,974 B2
(45) Date of Patent: Jun. 5, 2007

(54) MOBILE UNIT IDENTIFICATION APPARATUS AND METHOD AND APPARATUS FOR AUTOMATICALLY WARNING TO MOBILE UNIT

(75) Inventors: Shunsuke Kamijo, Kawasaki (JP); Masao Sakauchi, Yokohama (JP); Katsushi Ikeuchi, Yokohama (JP)

(73) Assignees: Fujitsu Limited, Kawasaki (JP); The Foundation for the Promotion of Industrial Science, Tokyo (JP)

( * ) Notice: Subject to any disclaimer, the term of this patent is extended or adjusted under 35 U.S.C. 154(b) by 816 days.

(21) Appl. No.: 10/108,342

(22) Filed: Mar. 29, 2002

(65) Prior Publication Data

US 2002/0167588 A1 Nov. 14, 2002

(30) Foreign Application Priority Data

May 11, 2001 (JP) ............................ 2001-142375

(51) Int. Cl.
*G06K 9/00* (2006.01)

(52) U.S. Cl. ...................................................... 382/103

(58) Field of Classification Search ........ 382/103–104; 340/928, 937
See application file for complete search history.

(56) References Cited

U.S. PATENT DOCUMENTS 5,590,217 A * 12/1996 Toyama ...................... 382/104
5,948,038 A 9/1999 Daly et al.
5,969,641 A * 10/1999 Nakamura et al. .......... 340/928

(Continued)

FOREIGN PATENT DOCUMENTS

DE 196 33 240 A1 2/1998

(Continued)

OTHER PUBLICATIONS

Shunsuke Kamijo, et al. "Traffic Monitoring and Accident Detection at Intersections." IEEE Transactions on Intelligent Transportation Systems, vol. 1, No. 2, Jun. 2000 (pp. 108-118).

(Continued)

*Primary Examiner*—Matthew C. Bella
*Assistant Examiner*—Tom Y. Lu
(74) *Attorney, Agent, or Firm*—Staas & Halsey LLP

(57) ABSTRACT

By narrow region communication between a gate side communication apparatus (G-COM) and a mobile unit side communication apparatus (M-COM) passing through an on-road real gate at an interconnection, the G-COM assigns a real identification code (R-ID) ID1 including an intersection number to the M-COM after receiving a R-ID ID0 having been assigned from the M-COM, while time series pictures of the intersection including all real gates are taken by a camera 15 installed to assign a virtual identification code (V-ID) to a mobile unit passing through a slit, corresponding to a real gate, in pictures by processing them. In response to the assignment of the R-ID, the R-ID is brought into correspondence with the V-ID. The mobile unit is tracked and when an anomalous behavior thereof is detected in pictures, warning information is transmitted to the M-COM using the corresponding R-ID. By gathering sets of ID0 and ID1 associated with each other in a plurality of intersections, a mobile unit having displayed an anomalous behavior is tracked.

16 Claims, 15 Drawing Sheets

U.S. PATENT DOCUMENTS

| | | | | |
|---|---|---|---|---|
| 6,111,523 | A | 8/2000 | Mee | |
| 6,140,941 | A * | 10/2000 | Dwyer et al. | 340/928 |
| 6,538,580 | B2 * | 3/2003 | Bostrom et al. | 340/933 |

FOREIGN PATENT DOCUMENTS

| | | | |
|---|---|---|---|
| EP | 0 713 201 | A2 | 5/1996 |
| EP | 0784297 | A2 * | 7/1997 |
| JP | 2001-148019 | | 5/2001 |
| WO | WO 00/48132 | | 8/2000 |

OTHER PUBLICATIONS

Shunsuke Kamijo, et al. "Incident Detection at Intersections Utilizing Hidden Markov Model." $6^{th}$ World Congress on Intelligent Transport Systems, Nov. 8-12, 1999, Toronto, Canada (pp. 1-10).

Shunsuke Kamijo, et al. "Occlusion Robust Vehicle Tracking Utilizing Spatio - Temporal Markov Random Field Model." $7^{th}$ World Congress on Intelligent Transport Systems, Nov. 6-9, 2000, Turin, Italy (5pp).

* cited by examiner

FIG.5

| ID1 | | |
|---|---|---|
| INTER-SECTION NO. | GATE NO. | COUNTER |
| 3 | 0 | 0003A5 |
| | 1 | 000329 |
| | 2 | 000125 |
| | 3 | 0002C2 |
| | 4 | 00007B |
| | 5 | 0006F5 |
| | 6 | 000736 |
| | 7 | 000629 |

FIG.8

| | ID2 | L/S | T2 | ID1(1) | ID1(2) | F |
|---|---|---|---|---|---|---|
| EN1 | 0 | 1 | 09:32:43:15 | 0 | 0 | 0 |
| | 1 | 0 | 09:34:25:12 | 300003A5 | 30000329 | 1 |
| | ⋮ | ⋮ | ⋮ | ⋮ | ⋮ | ⋮ |
| | F | 0 | 09:28:47:42 | 0 | 0 | 0 |
| EN2 | 10 | 0 | 09:29:36:27 | 0 | 0 | 0 |
| | 11 | 1 | 09:34:23:56 | 330002C2 | 0 | 1 |
| | ⋮ | ⋮ | ⋮ | ⋮ | ⋮ | ⋮ |
| | 1F | 0 | 09:30:51:32 | 0 | 0 | 0 |
| EN3 | 20 | 0 | 09:27:39:17 | 0 | 0 | 0 |
| | 21 | 0 | 09:28:02:08 | 0 | 0 | 0 |
| | ⋮ | ⋮ | ⋮ | ⋮ | ⋮ | ⋮ |
| | 2F | 1 | 09:34:21:53 | 350006F5 | 0 | 1 |
| EN4 | 30 | 0 | 09:34:26:19 | 36000736 | 0 | 1 |
| | 31 | 1 | 09:33:15:28 | 0 | 0 | 0 |
| | ⋮ | ⋮ | ⋮ | ⋮ | ⋮ | ⋮ |
| | 3F | 0 | 09:31:18:47 | 0 | 0 | 0 |

MOBILE UNIT IDENTIFICATION APPARATUS AND METHOD AND APPARATUS FOR AUTOMATICALLY WARNING TO MOBILE UNIT

BACKGROUND OF THE INVENTION

1. Field of the Invention

The present invention relates to a mobile unit identification apparatus bringing a real identification code which may be a personal identification code of a mobile communication apparatus into correspondence with a mobile unit in pictures, and more specifically, to a method and an apparatus for automatically warning using the real identification codes of a mobile unit, whose anomalous behavior is detected in pictures, or another mobile unit associated therewith.

2. Description of the Related Art

With an electronic toll collection (ETC) system automatically performing non-stop collection of a passage fee to a vehicle passing through a tollgate on a toll road, it is possible to obtain information that a vehicle has driven from which to which tollgate.

Although an ETC card has personal information recorded thereon, such a system can use it only for toll collection due to privacy protection.

On the other hand, even if an anomalous behavior of a vehicle is automatically detected by picking up an image of an intersection with a camera to process the image, it is impossible to transmit warning information to the communication apparatus in the specified vehicle.

SUMMARY OF THE INVENTION

Accordingly, it is an object of the present invention to provide a mobile unite identification apparatus and a method and an apparatus for warning to a mobile unit, capable of transmitting information such as a warning to a specified mobile unite having performed an anomalous behavior or the like.

It is another object of the present invention to provide a mobile unite identification device and a method and an apparatus for warning to a mobile unit, capable of tracking a mobile unite without violating privacy.

In one aspect of the present invention, there is provided a warning method to mobile units, comprising the steps of:

(a) performing narrow region communication with a mobile unit side communication apparatus passing through an on-road real gate either to assign a real identification code to the mobile unit side communication apparatus or to receive the real identification code having been assigned to the mobile unit side communication apparatus;

(b) taking time series pictures with an electronic camera installed on a road side with training on a region including the real gate;

(c) processing the time series pictures to bring a mobile unit passing through a slit in ones of the pictures into correspondence with the real identification code, the slit corresponding to the real gate;

(d) processing the time series pictures to track the mobile unit having been brought into the correspondence to detect an anomalous behavior thereof; and (e) transmitting warning information to the mobile unit side communication apparatus with the real identification code of the mobile unit having displayed the anomalous behavior or of another mobile unit associated therewith.

With this configuration, the real identification code (which may be a personal identification code) of the mobile communication apparatus is brought into correspondence with the mobile unite in pictures taken with the electronic camera, the mobile unite is tracked in the pictures, and an anomalous behavior thereof is detected, therefore warning information can be transmitted to the mobile unite having displayed the anomalous behavior or another mobile unite associated therewith. In a case where a temporary real identification code is assigned to the mobile communication apparatus, violation of privacy can be prevented even use of the real identification code is prohibited by law.

If the steps (a) through (e) are performed at each of the intersections, wherein in the step (a), in regard to each intersection, the real identification code includes a intersection identification code and the real identification code is assigned to the mobile unit side communication apparatus after receiving another real identification code having been assigned from the mobile unit side communication, by gathering sets each having the assigned and received real identification codes, the sets being associated with each other among the plurality of intersections, it is possible to track the mobile unit having displayed an anomalous behavior without violation of privacy.

Other aspects, objects, and the advantages of the present invention will become apparent from the following detailed description taken in connection with the accompanying drawings.

BRIEF DESCRIPTION OF THE DRAWINGS

FIG. 5 is a table showing a configuration and concrete example of a real identification code ID1 assigned at the gate side communication apparatus;

FIG. 8 is an illustration of a configuration of the ID correspondence table in FIG. 1;

FIGS. 15(A) ad 15(B) are illustrations in which blocks BL1 to BL3 are set on the same pictures as FIGS. 14(A) and 14(B) to determine on which separated mobile units the block of the non-separated mobile units belongs to.

DESCRIPTION OF THE PREFERRED EMBODIMENT

Figure 1:
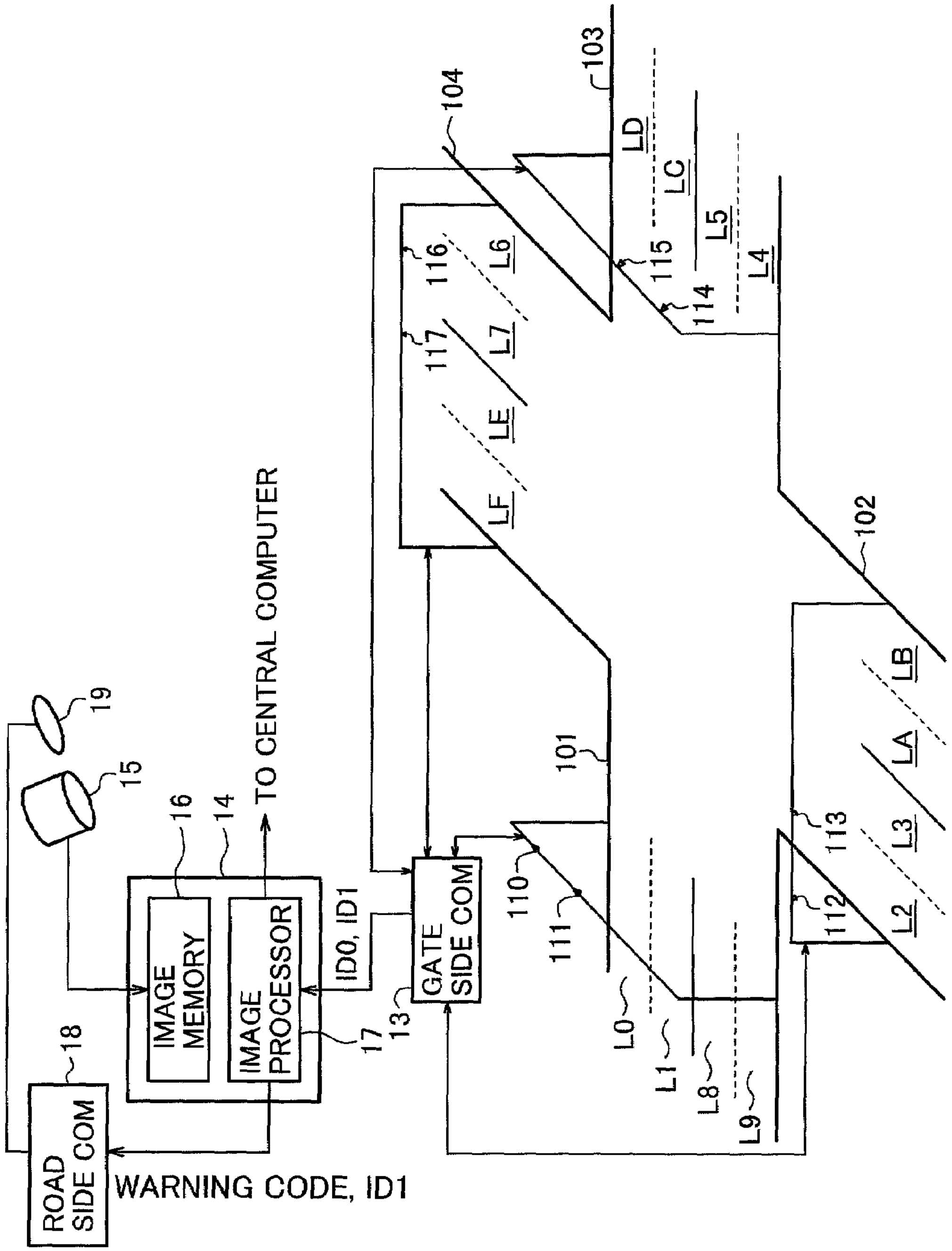
FIG. 1 is a schematic diagram showing a configuration of an automatic warning apparatus to mobile units installed at an intersection, of an embodiment according to the present invention.

Referring now to the drawings, wherein like reference characters designate like or corresponding parts throughout several views, preferred embodiments of the present invention are described below.

FIG. 1 shows a schematic configuration of an automatic warning apparatus to mobile units installed at an intersection.

Figure 3:
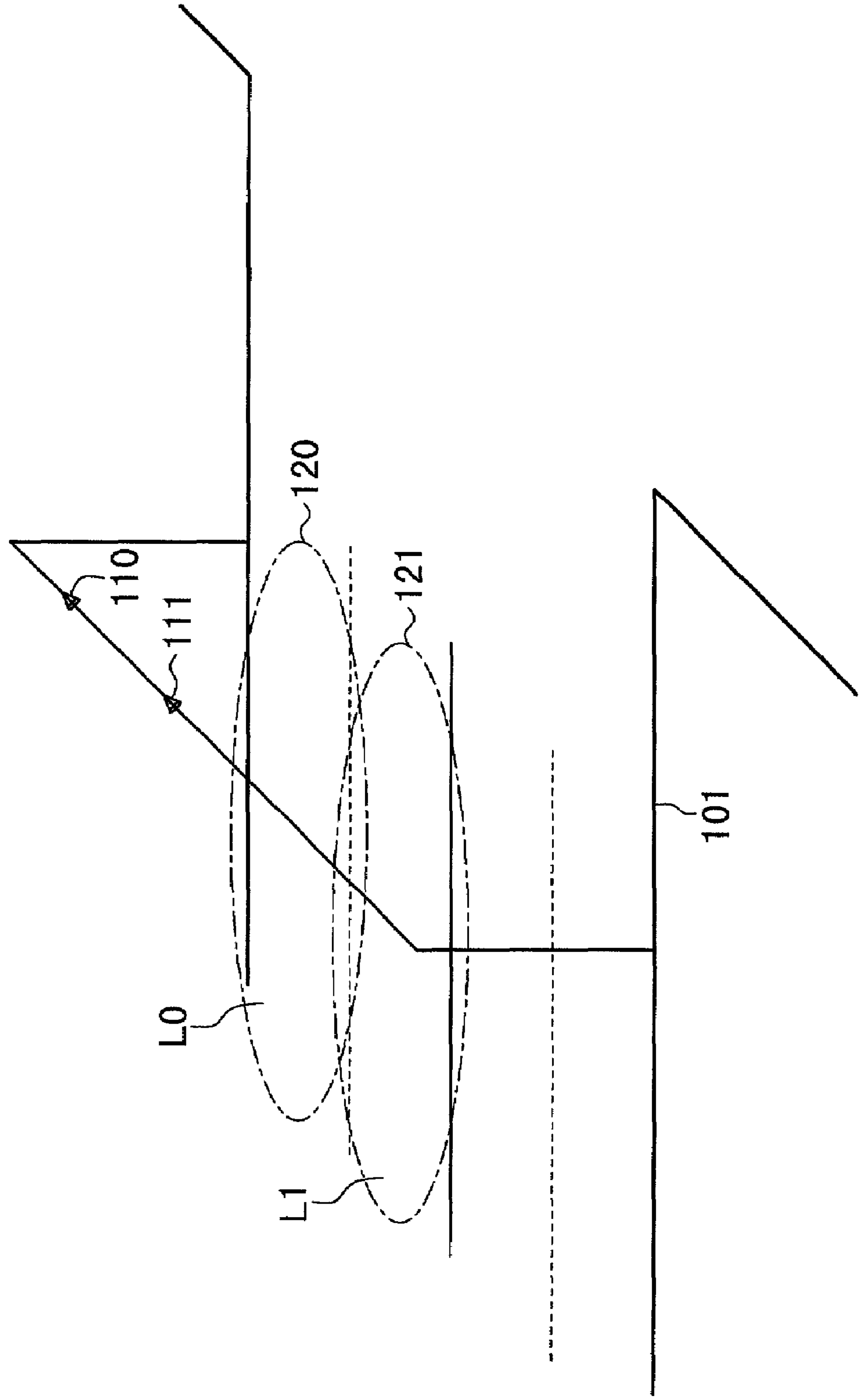
FIG. 3 is an illustration of on-road communicable areas of gate side antennas installed at part of the intersection of FIG. 1.

Roads 101 to 104 intersecting each other are divided into a set of lanes L0 to L7 through which vehicles enters into the intersection and a set of lanes L8, L9 and LA to LF into which vehicles enters from the intersection. Gate side antennas 110 to 117 for communicating with respective on-vehicle communication apparatuses are installed over the lanes L0 to L7, respectively, near the intersection. The antennas 110 to 117 are for use in narrow region communication, and FIG. 3 shows on-road communicable areas 120 and 121 of respective antennas 110 and 111. Communicable areas between the gate side antennas 110 to 117 and respective on-vehicle communication apparatuses are hereinafter referred to as gates which are discriminated from each other with gate numbers 0 to 7, respectively. The antennas are of the same configuration as each other, and ones for use in optical or radio beacon. The gate side antennas 110 to 117 are connected to a gate side communication apparatus 13.

Figure 4:
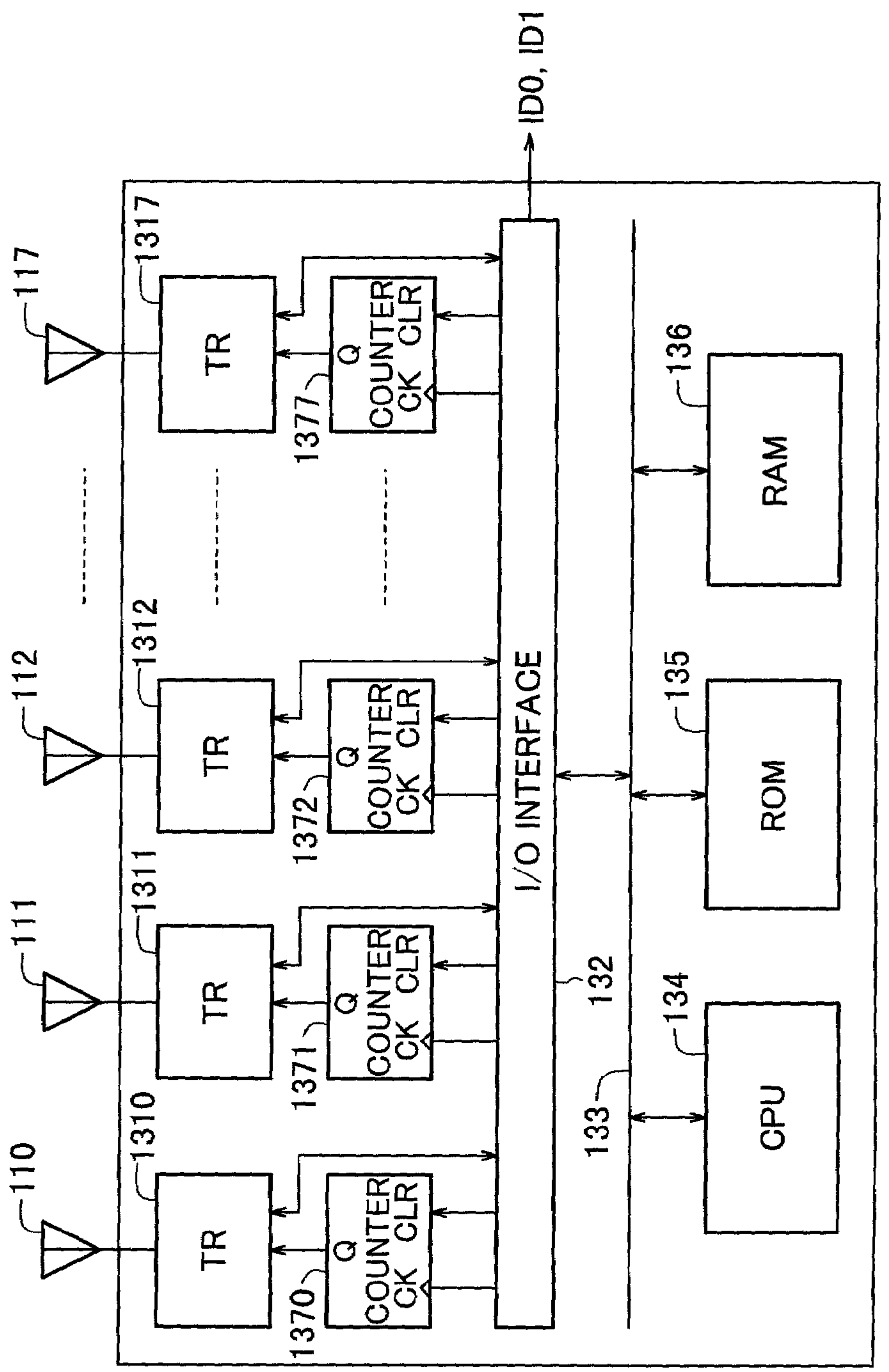
FIG. 4 is a schematic block diagram of the gate side communication apparatus of FIG. 1.

FIG. 4 is a schematic block diagram of the gate side communication apparatus 13.

Transmitter-receivers 1310 to 1317 connected to the antennas 110 to 117, respectively, are connected to an I/O interface 132. The I/O interface 132 is connected to a CPU 134 through a bus 133. The CPU 134 is connected to a ROM 135 and a RAM 136 through the bus 133. The ROM 135 is used for storage of programs and fixed data, and the RAM 136 is used for work area. In the ROM 135, there is stored an assigned intersection number. The transmitter-receivers 1310 to 1317 receive the counts of the counters 1370 to 1377, respectively. In initialization upon resetting of the gate side communication apparatus 13, the counters 1370 to 1377 are zero cleared and the intersection number and corresponding gate numbers are written into registers of the transmitter-receivers 1310 to 1317 by the CPU 134. The CPU 134 is able to selectively provide a clock pulse to any one of the counters 1370 to 1377 through the I/O interface 132 to count up.

FIG. 5 shows correspondence between the counts of the counters 1370 to 1377 of FIG. 4 and the gate numbers at a certain time. Numerical values of FIG. 5 are represented in hexadecimal. In FIG. 5, a combination of an intersection number, a gate number and a count constitutes a real identification code ID1 which is temporarily assigned to a passing vehicle and has no relation to personal information. For example, in a case where the count of the counter 1371 is 000125 with an intersection number being 3 and a gate number being 2, ID1 is 32000125.

Figure 6:
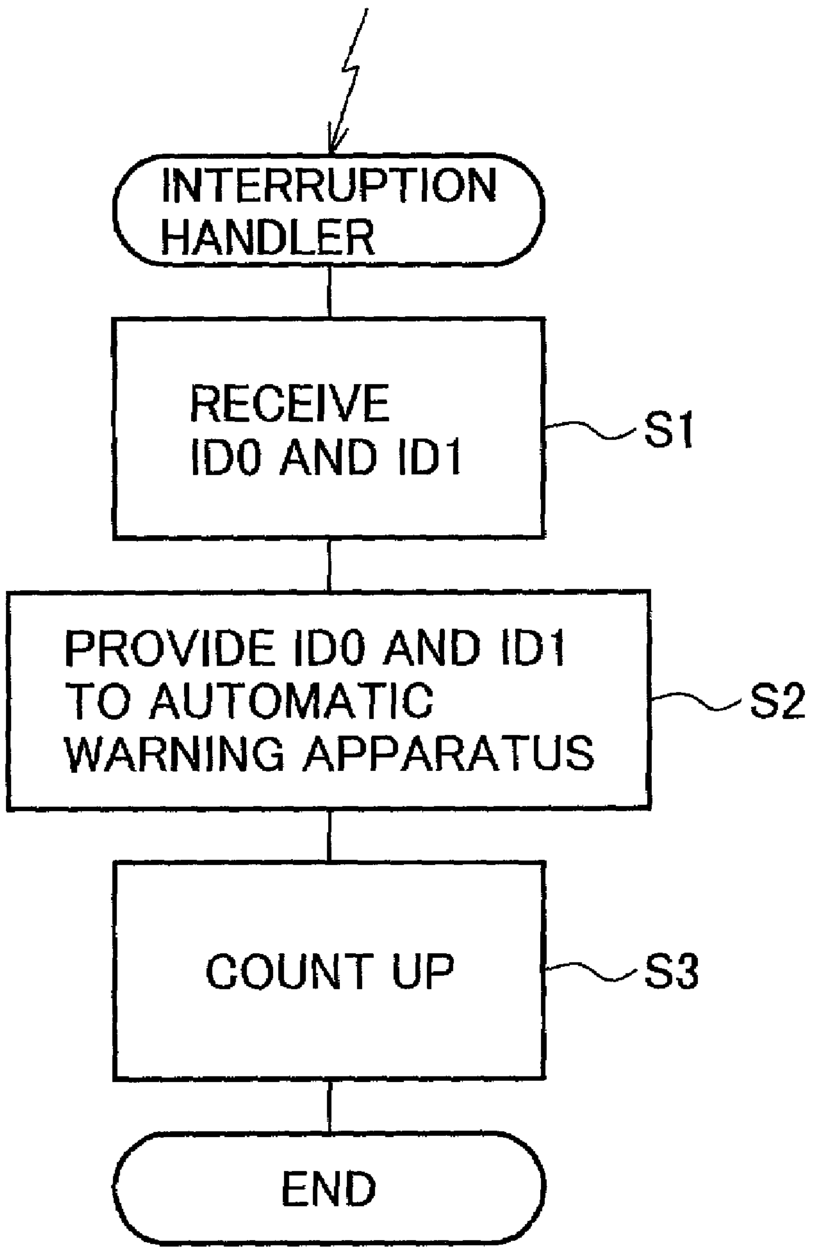
FIG. 6 is a flow chart showing an interruption handler executed by the CPU of FIG. 4.

When the above described initialization has been completed, the CPU 134 issues an operation start command to the transmitter-receivers 1310 to 1317 through the I/O interface 132. After this issuance, each of the transmitter-receivers 1310 to 1317 cyclically outputs a signal for starting communication with vehicle. When an on-vehicle communication apparatus has responded to this signal, a transmitter-receiver communicates with the on-vehicle communication apparatus to receive an identification code having temporarily assigned to the on-vehicle communication apparatus as a real identification code ID0 for tracking a mobile unit between intersections and to transmit a real identification code ID1 to the on-vehicle communication apparatus. The on-vehicle communication apparatus transmits the received real identification code ID1 back to the transmitter-receiver for confirmation. If the received real identification code ID1 coincides with the transmitted real identification code, the transmitter-receiver causes the CPU 134 through the I/O interface 132 to perform the interruption handler of FIG. 6.

(S1) The CPU 134 receives the real identification code ID0 from the transmitter-receiver having caused the interruption and reads a gate number corresponding to the transmitter-receiver and a count to generate the real identification code ID1 which is the same as one that the transmitter-receiver has assigned to the on-vehicle communication apparatus. The real identification ID0 is one that has been assigned at another intersection and the configuration thereof is the same as that of the real identification code ID1.

(S2) The CPU 134 provides the real identification codes ID0 and ID1 to the outside through the I/O interface 132 to send the automatic warning apparatus 14 of FIG. 1 them.

(S3) One clock pulse is fed to the counter of step S1 for counting up. In this way, one run of interruption is completed.

By assigning a temporary real identification code ID1 to an on-vehicle communication apparatus in such a way, the privacy of a driver is prevented from being violated. However, it is not possible to track the vehicle to which a real identification code ID1 has been assigned at an intersection, where traffic jam tends to occur by a trouble. Hence, image processing is performed to realize this tracking.

Referring back to FIG. 1, an electronic camera 15 for taking pictures of a region including all the gates is installed above the intersection. A time series of pictures taken with the electronic camera 15 are stored into an image memory 16 of the automatic warning apparatus 14 at a rate of, for example, 12 frames/sec. An image processor 17 of the automatic warning apparatus 14 processes the images to assign a virtual identification code ID2 to a mobile unit independently of the gate communication apparatus 13. The image processor 17 tracks a mobile unite to determine whether or not the behavior of the mobile unit is anomalous.

Figure 2:
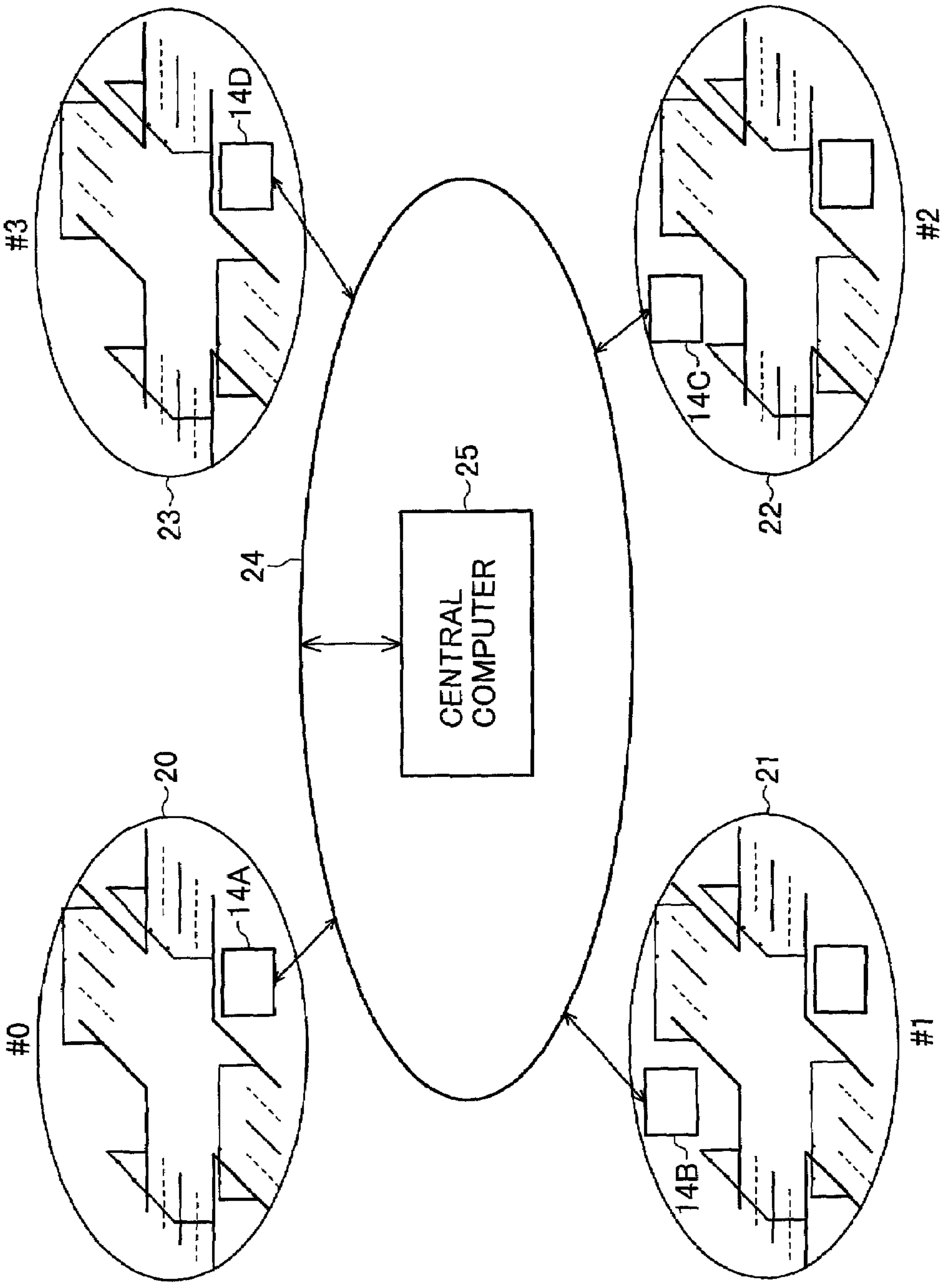
FIG. 2 is a schematic diagram showing a networked system comprising an automatic warning apparatus installed at a plurality of respective intersections and a central computer.

As shown in FIG. 2, the apparatus of FIG. 1 are installed at each of intersections 20 to 23, the automatic warning apparatuses 14A to 14D of which are connected to a central computer 25 through the transmission lines network 24. Intersection numbers 0 to 3 are assigned to the respective intersections 20 to 23.

Figure 7:
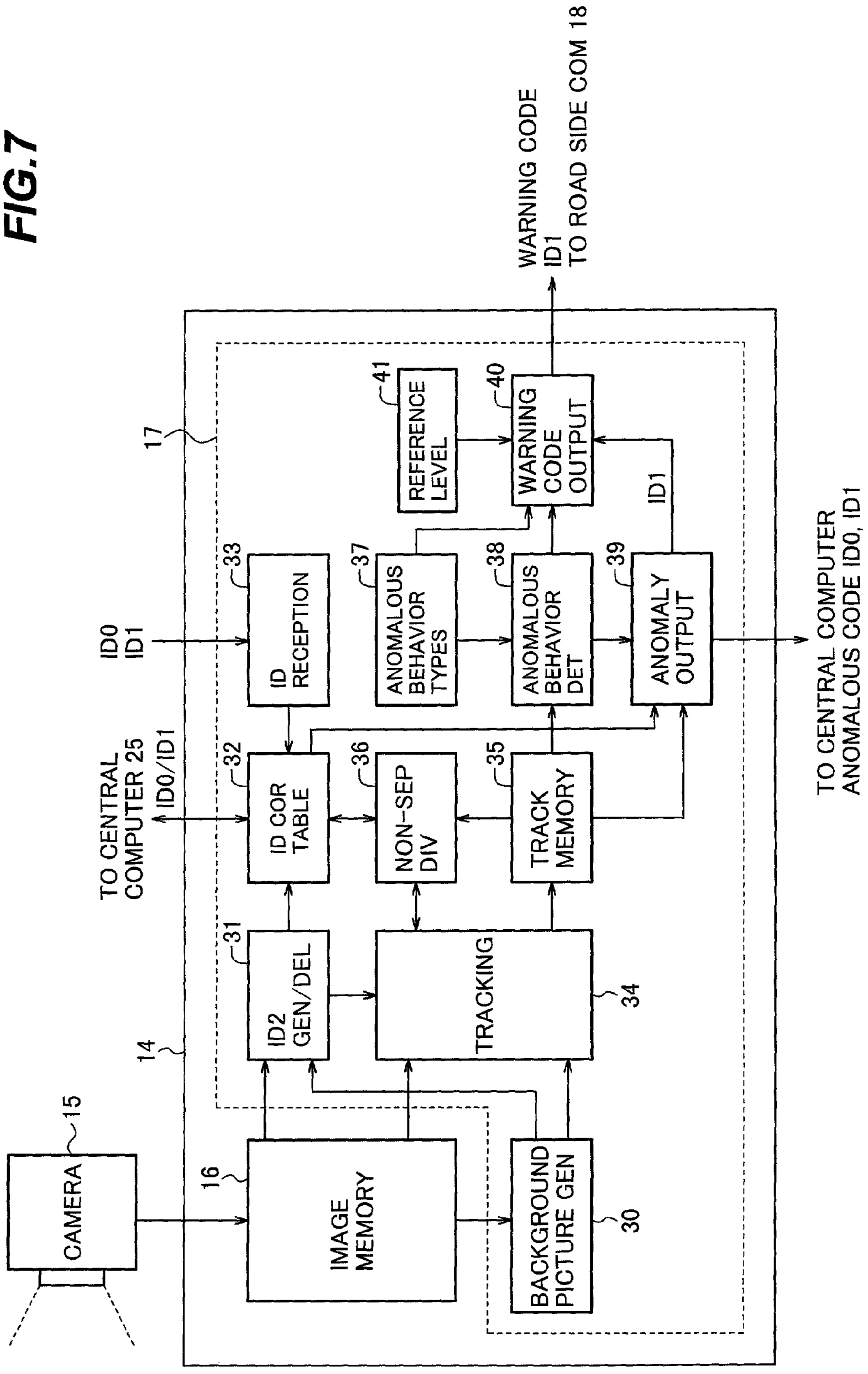
FIG. 7 is a functional block diagram of the automatic warning apparatus 14 of FIG. 1.

FIG. 7 is a block diagram showing a configuration of the automatic warning apparatus 14. In the automatic warning apparatus 14, all or part of its constituents can be constituted of a computer and leased hardware configuration is employed according to a necessary operating speed.

Now, detailed description will be given of the image processor 17.

A background picture generation section 30 accesses the image memory 16 to generate each histogram of values of pixels at the same position in all the frames, for example, for the previous 10 minutes and to generates a picture whose each pixel value is equal to a mode of a corresponding histogram as a background picture. This processing is regularly repeated to update the background picture.

Figure 9:
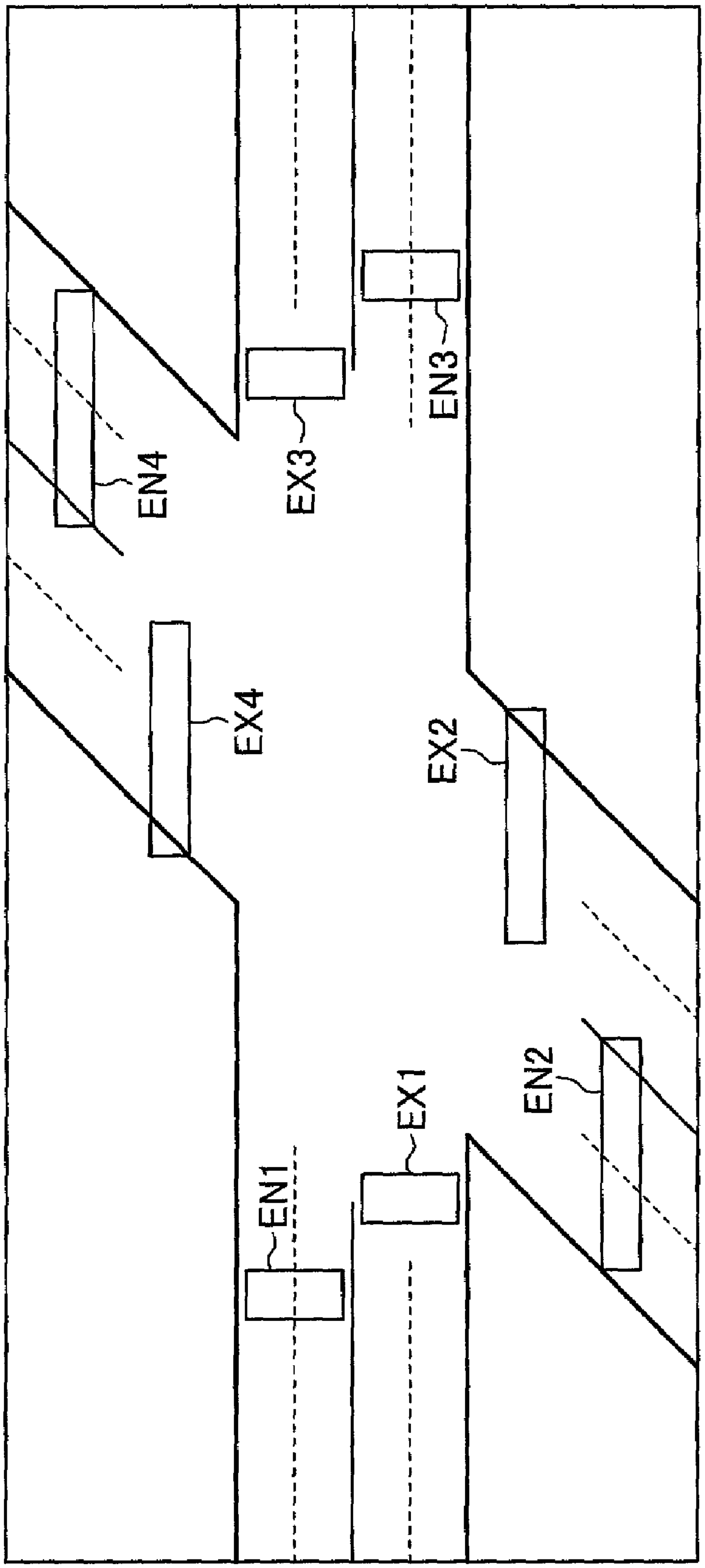
FIG. 9 is an illustration of entrance slits EN1 to EN4 and exit slits EX1 to EX4 set in advance in a picture correspondingly to real gates.

In order to bring a virtual identification code ID2 assigned in an ID2 generation/deletion section 31 into correspondence with a real identification code ID1 assigned in the gate identification device 13, as shown in FIG. 9, entrance slits EN1 to EN4 which corresponds to the real gates are set in advance in a picture. For example, the entrance slit EN1 corresponds to the gate numbers 0 and 1 and the entrance slit EN2 corresponds to the gate numbers 2 and 3. Each position of the entrance slits EN1 to EN4 is set such that a real identification code ID1 is assigned after a virtual identification ID2 is assigned, as described later. Further, in order to release, at a specified position, a virtual identification code ID2 having been assigned, the exit slits EX1 to EX4 are set in advance in a picture. The ID2 generation/deletion section 31 has data of the in-picture positions and sizes of the entrance slits EN1 to EN4 and the exist slits EX1 to EX4, and on the basis of the data, cuts out images in the ranges of the entrance slits EN1 to EN4 and the exit slits EX1 to EX4 from a current image in the image memory 16 and a background picture in the background picture generation section 30 to compare corresponding ones so as to detect mobile units.

An ID correspondence table 32 has such a configuration as shown in FIG. 8 wherein real identification codes ID1 and virtual identification codes ID2 are hexadecimal. Groups of ID2=0 to F, 10 to 1F, 20 to 2F, and 30 to 3F are for assignment to mobile units entering the entrance slits EN1 to EN4, respectively. Flag F='1' indicates that corresponding virtual identification ID2 has been assigned and flag F='0' indicates that corresponding virtual identification code ID2 can be used in assignment. The ID correspondence table 32 further has an ID0/ID1 correspondence table not shown in which correspondence between the real identification codes ID0 and ID1 are performed.

Figure 10:
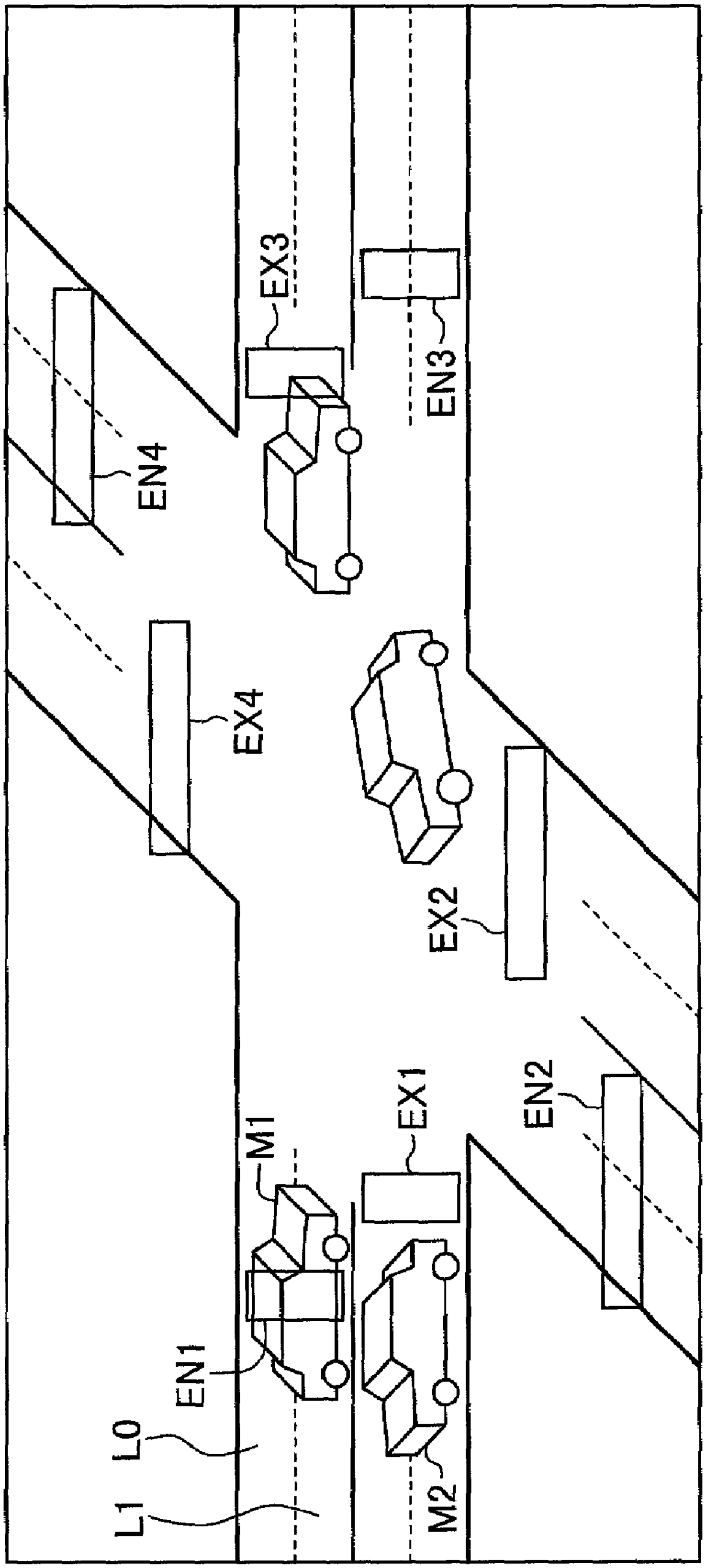
FIG. 10 is an illustration of a relationship between set slits and mobile units.

The ID2 generation/deletion section 31 refers to the ID correspondence table 32 to assign a virtual identification ID2 with F='0' to the mobile unit when it has determined that part of the mobile unit has entered into an entrance slit, writes a time T2 in the ID correspondence table and sets F='1'. For example, to a mobile unit Ml in FIG. 10, a virtual identification code ID2 has been assigned. The ID2 generation/deletion section 31 sets a corresponding L/S in the ID correspondence table 32 to '1' or '0' according to whether or not the gravity center of the mobile unit in the entrance slit is located on the larger gate number side or the smaller gate number side of the entrance slit when an ID reception section 33 has received real identification codes ID0 and ID1. For example, if the gravity center of a mobile unit in the entrance slit EN1 is located on the upper half side (the side with a smaller gate number) of the EN1, the LS is set to '0', while if being on the lower half side (the side with a larger gate number) thereof, the L/S is set to '1'. The entrance slits EN1 to EN4 are set so that this determination may be performed as accurate as possible.

When a mobile unit having a virtual identification code ID2 has completely passed through an exist slit, by setting a corresponding flag F to '0' in the ID correspondence table 32, the ID2 generation/deletion section 31 releases the virtual identification code ID2 having been assigned. For example, since a mobile unit M2 in FIG. 10 completely passed the entrance slit EX1, the virtual identification code ID2 is already free. The ID2 generation/deletion section 31 zero clears the real identification codes ID1(0) and ID1(2) when setting F='0'.

When having received real identification codes ID0 and ID1 from the gate side communication apparatus 13, the ID reception section 33 temporarily stores the time Ti of the reception therein to write not only the time T1 into the above ID0/ID1 table of the ID correspondence table 32, but also the real identification code ID1 into corresponding ID1(1) of the ID correspondence table 32. For example, in a case of ID1=32000125, there is searched a row that ID2 is in the range of 10 to 1F, F='1', L/S='0', T1>T2, and (T1–T2) is smaller than a predetermined value, and then if ID1(1)=0, the real identification ID1 is written into ID1(1).

Figure 11:
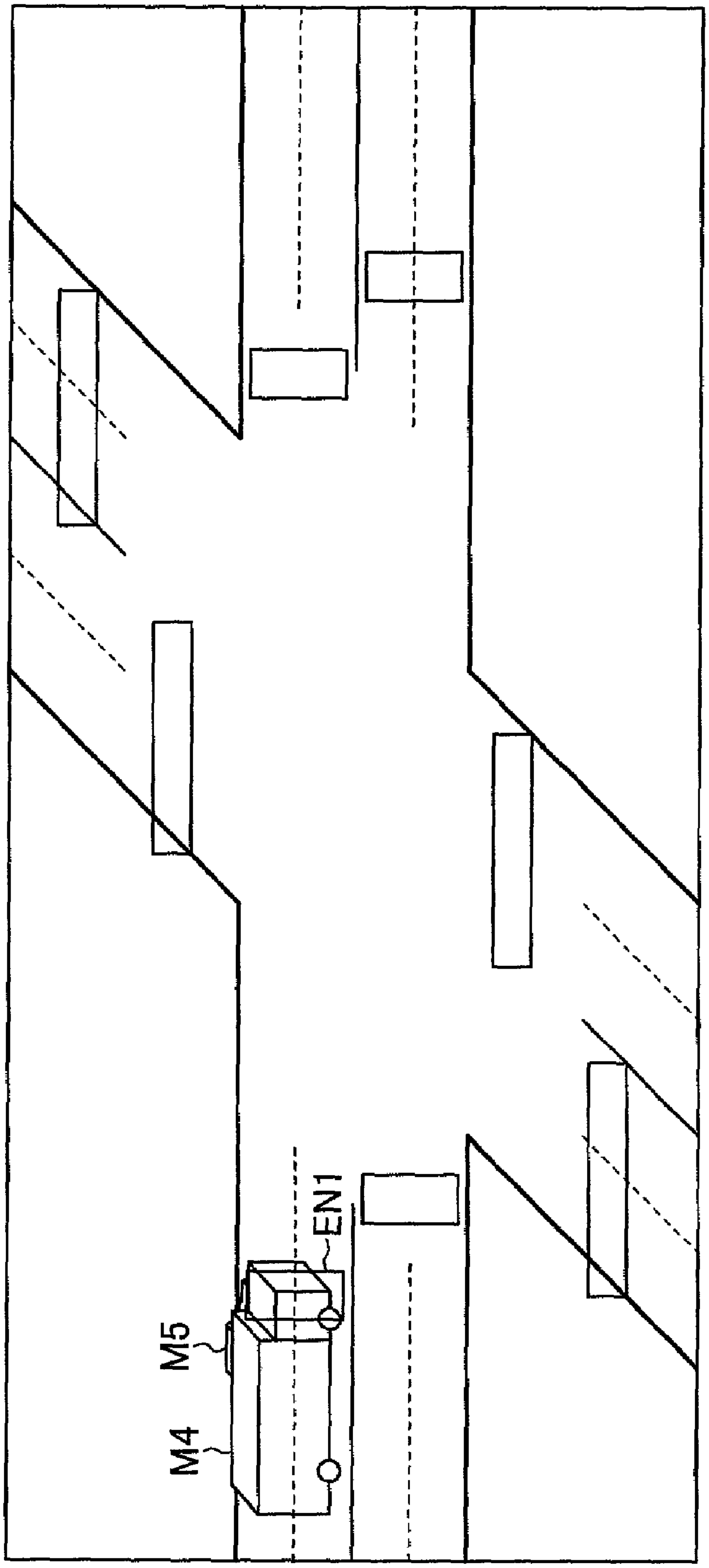
FIG. 11 is an illustration of assignment of virtual identification codes ID2 to two mobile units entered into an entrance slit without being separated from each other.

For example, as shown in FIG. 11, in a case where two mobile units has entered into the entrance slit EN1 without separation from each other, the ID2 generation/deletion section 31 determines them as one mobile unit to assign one virtual identification code ID2 to it. In this case, since only one virtual identification code ID2 corresponding to two real identification codes ID1 is in the ID correspondence table 32, the ID reception section 32 writes the two real identifications ID1 into respective ID1(1) and ID1(2) each having 0 in the row of this virtual identification code ID2.

A tracking section 34 obtains velocity vectors at the time (t-1) of the mobile units, having the virtual identification code ID2 that has been assigned by the ID2 generation/deletion section 31, from positions of the mobile unites at the times (t-2) and (t-1) at when detection of the mobile units has already completed. Then the tracking section 34 predicts the areas of the mobile units at a current time t where the mobile units would be located if they moved at respective those vectors from the time (t-1), extends each of the predicted areas toward left, right, up and down therefrom by a given number of pixels, cuts off images from the extended areas in the current picture and the background picture, and compares the both to determine the positions of the mobile units at the current time t. With such a procedure, tracking of each mobile unit is performed with good efficiency. The tracking section 34 draws the track of each mobile unit by writing the position of the mobile unit at the current time t into a track memory 35. To each track a virtual identification code ID2 is assigned.

Even if a mobile unit has no communication apparatus, a traffic accident, if found by image processing, can be immediately dealt with by giving the central computer 25 a notice of the traffic accident; therefore, the assignment of a virtual identification code ID2 by the ID2 generation/deletion section 31 and the tracking by the tracking section 34 are performed independently of the assignment of a real identification code ID1.

Figure 12:
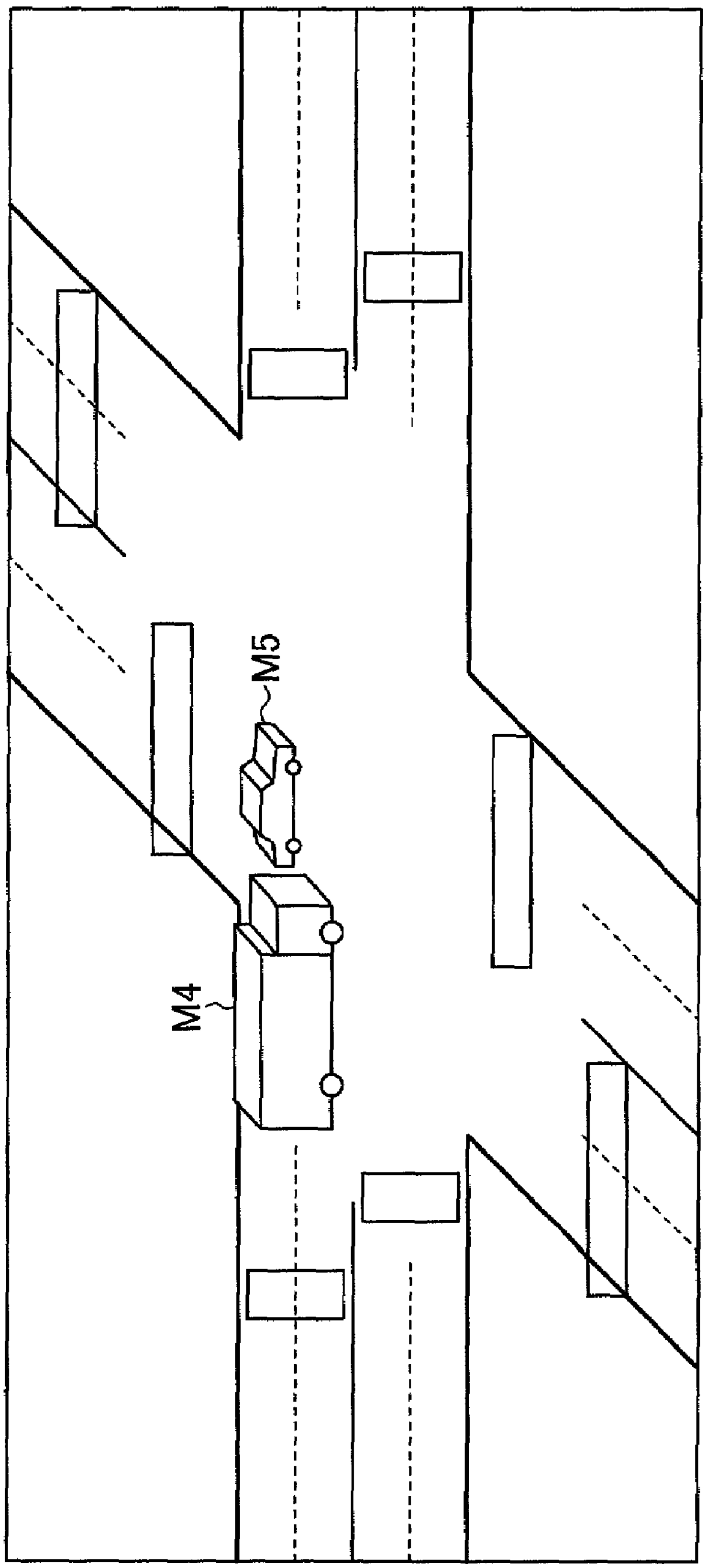
FIG. 12 is an illustration of a state where the two mobile unites are separated after a time has elapsed from the state of FIG. 11.

Meanwhile, even if two mobile units has entered into the entrance slit EN1 as shown in FIG. 11 without separation from each other, after a time has elapsed, the two mobile units may separate as shown in FIG. 12 because of differences in speed or moving direction therebetween. In this state, by bringing part of the mobile unit M5 into correspondence with part of FIG. 11, the mobile unit M5 of FIG. 11 can be divided and distinguished from the mobile unit M4.

Figure 14A:
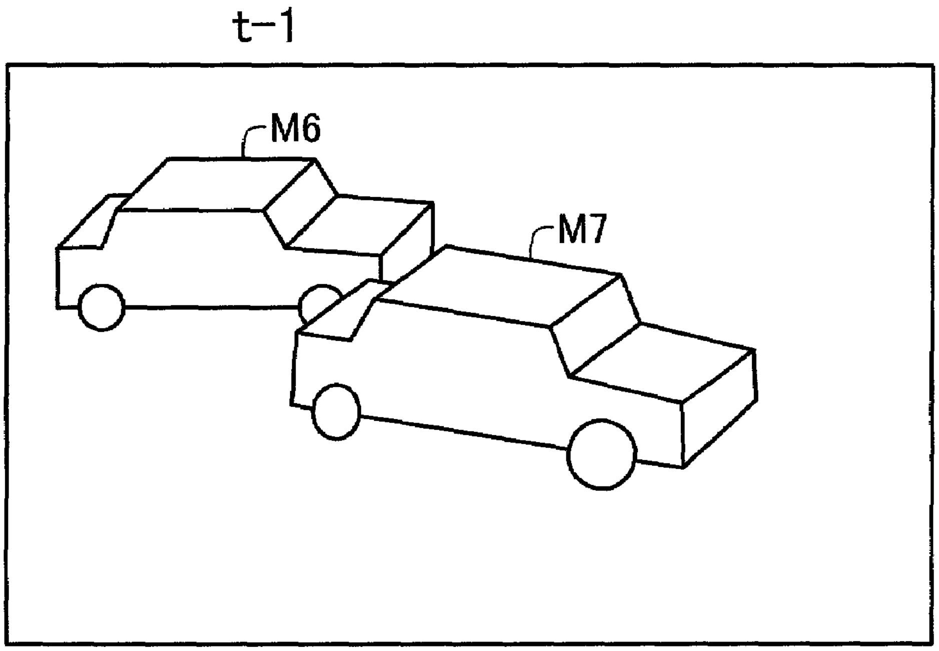
FIGS. 14(A) and 14(B) are illustrations of non-separated and separated mobile units at respective times (t-1) and t.
Figure 14B:
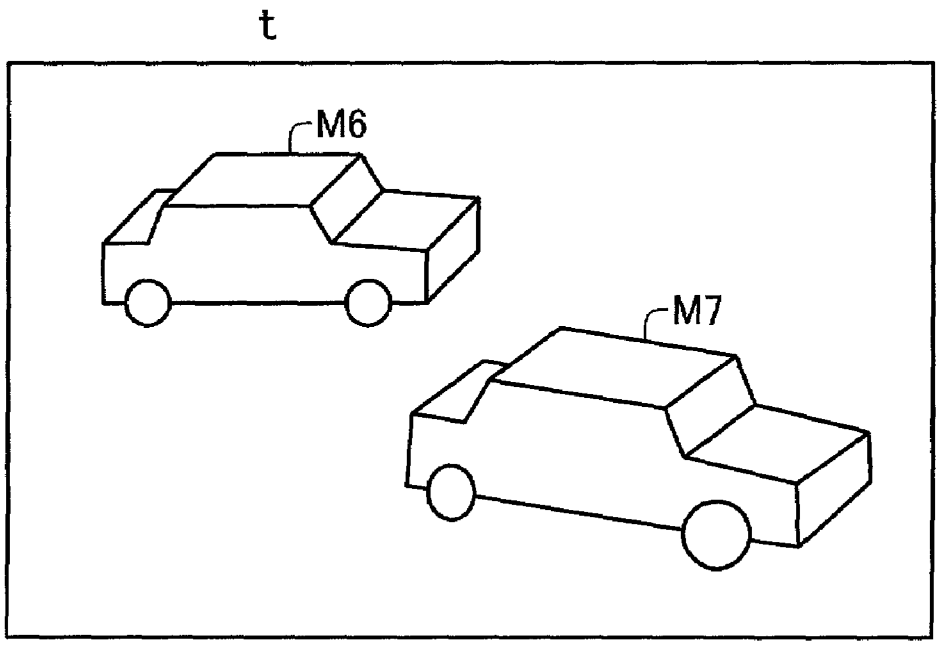
Figure 15A:
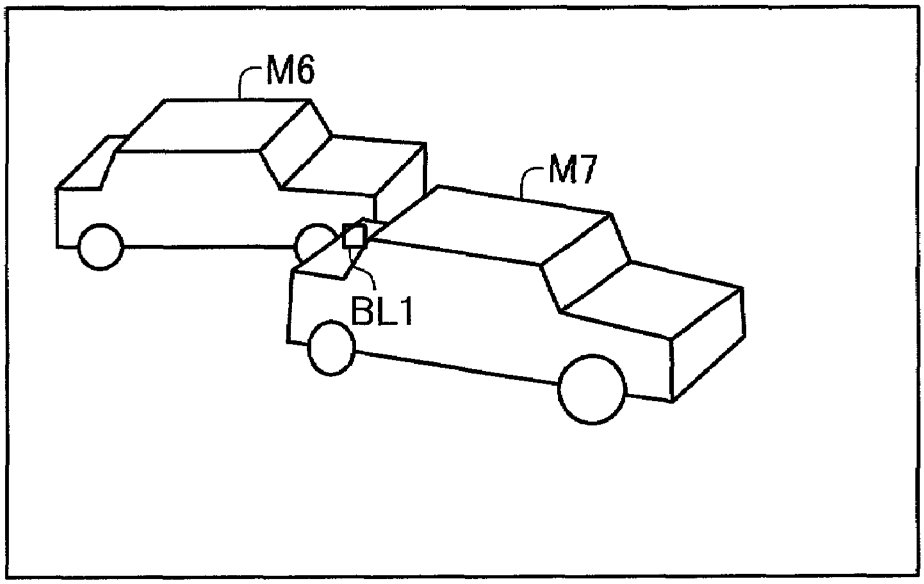
Figure 15B:
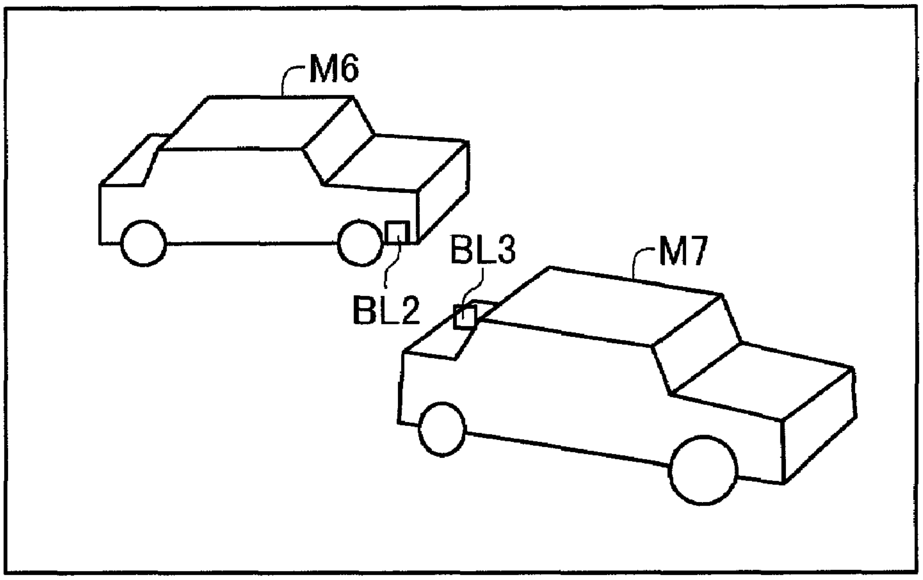

For example, consider that, as shown in FIG. 14(A), mobile units M6 and M7 are overlapped in a picture at a time (t-1), while as shown in FIG. 14(B), the both are separated at a time t. FIGS. 15(A) and 15(B) show pictures having blocks BL1 to BL3 set in the same pictures as those of FIGS. 14(A) and 14(B), respectively. The size of each block is, for example, of 8×8 pixels. It is determined in the following way whether in FIG. 15(A) the block BL1 at the time (t-1) is part of the mobile unit M6 or M7.

That is, the velocity vectors V1 and V2 of the mobile unites M6 and M7 in the picture at the time t are detected from FIG. 15(B) and a picture, not shown, at the next time, the block BL2 on FIG. 15(B) is obtained by moving the block BL1 by the vector V1, and the block BL3 on FIG. 15(B) is obtained by moving the block BL1 by the vector V2. Then, if (non-similarity between the block BL1 and the block BL2)>(non-similarity between the block BL1 and the block BL3), it is determined that the block BL1 belongs to the mobile unit M7. The non-similarity NS12 between the blocks BL1 and BL2 is calculated, for example, by the following equation:

$$NS12=\Sigma|Y1(i,j)-Y2(i,j)|$$

where, Y1(i,j) and Y2(i,j) are pixel values at the i-th raw and the j-th column in the block BL1 and the clock BL2, respectively, and Σ indicates a total sum of pixel values in the range of i=1 to 8 and j=1 to 8 (a total sum of all the pixels in a block).

In order to perform more correct determination, as in the method determining a moving vector in MPEG, a similarity (or non-similarity) between the blocks B11 and BL2 and between the blocks BL1 and BL3 are calculated each time the blocks BL2 and BL3 are moved toward left, right, up or down therefrom by one pixel within predetermined ranges whose centers are coincident with the respective centers of the block BL2 and BL3, and the maximum(or the minimum) of the similarity (or the non-similarity) between the blocks BL1 and BL2 is compared with that of the similarity (non-similarity) between the blocks BL1 and BL3 to determine to which of the mobile units M6 and M7 the block BL1 belongs.

By performing such processing on each block in FIG. 15(A), the non-separated mobile units M6 and M7 can be divided and discriminated with each other. If the both can be divided and discriminated at the time (t-1), the non-separated mobile units M6 and M7 at a time (t-2) can be divided and discriminated from the pictures at the times (t-1) and (t-2) in a similar way, and thus tracking can be performed in reverse chronological order.

A non-separated units division section 36 performs processing on the basis of a block correlation between mobile units in such a time space (time series pictures) to divide and discriminate non-separated mobile units with ID1(1)≠0 and ID1(2)≠0 in the ID correspondence table 32, and thereafter assigns another virtual identification code ID2 to put the identification codes ID1 and ID2 into one to one correspondence. The velocity vectors V1 and V2 described above can be obtained by using data in the track memory 35. Further, tracking in reverse chronological order is performed using a program in the tracking section 34.

Figure 13:
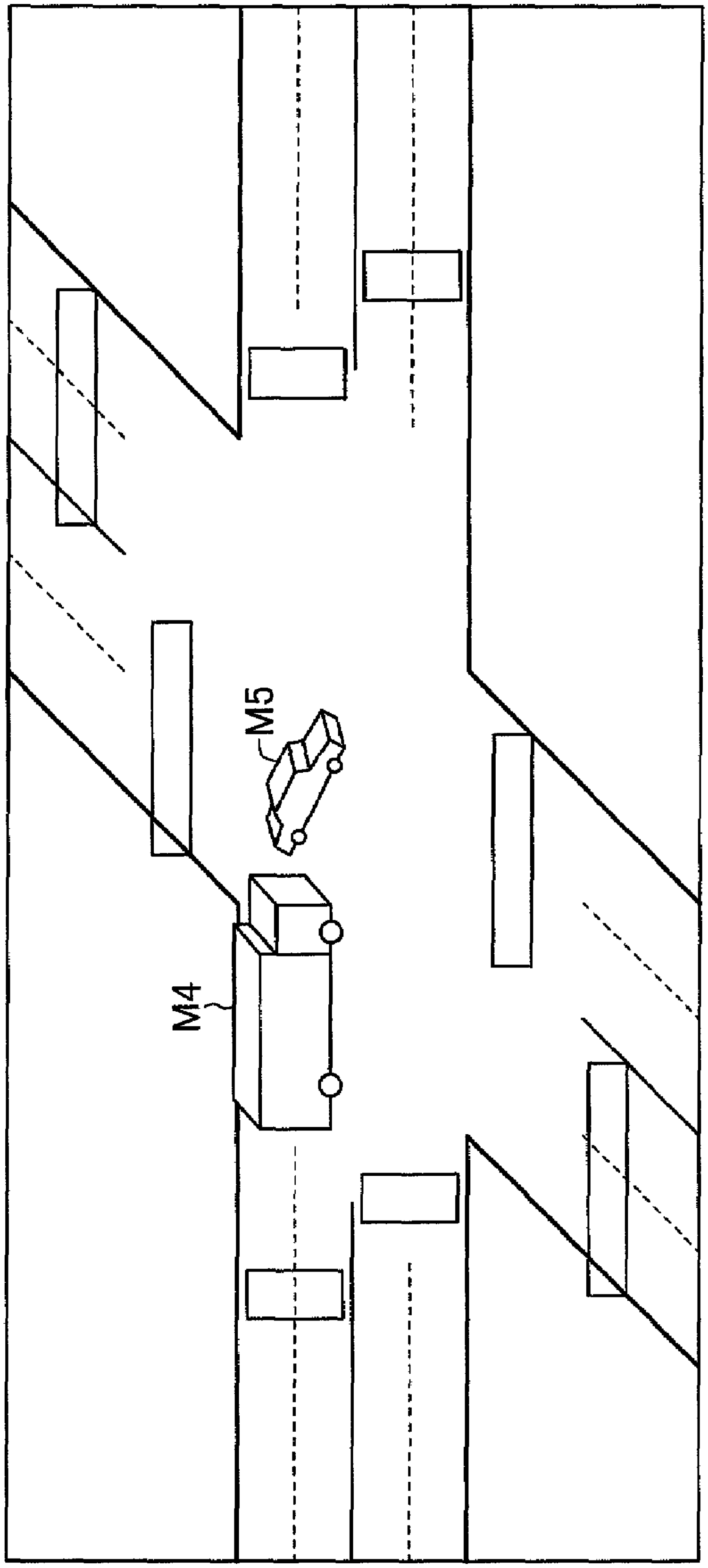
FIG. 13 is an illustration of an anomalous behavior in a picture.

Types of anomalous behaviors, identification codes thereof, and warning codes for respective anomalous behaviors are correspondingly registered in an anomalous behavior type registration section 37 in advance. The anomalous behaviors include a traffic violation behavior and a traffic accident. FIG. 13 shows an anomalous behavior that a mobile unit 5 turns right from a state of FIG. 12. An anomalous behavior determination section 38 calculates a similarity between a track drawn in the track memory 35 and each anomalous behavior type to determine the track to be an anomalous behavior if the similarity is more than a predetermined value and then sends the anomalous identification code thereof to an anomaly output section 39 and a warning code output section 40. In response to this, the anomaly output section 39 searches the ID correspondence table 32 for a real identification code ID1 with a key of the virtual identification code ID2 having been assigned to the track of the anomalous behavior, and if the corresponding real identification code ID1 exists, the anomaly output section 39 further searches the ID0/ID1 table for a real identification code ID0 with a key of the real identification code ID1. Then the anomaly output section 39 sends the real identification codes ID0 and ID1 to the central computer 25 together with the anomalous identification code. The anomaly output section 39 sends the anomalous identification code to the central computer 25 even if no ID correspondence has been found.

For example, in a case where ID0=23000153 and ID1=3400007B, the central computer 25 automatically causes the automatic warning apparatus 14C having the intersection number 2 in FIG. 2 to search the ID0/ID1 table for ID1=23000153 to obtain, for example, ID0=1500031A. Thereby it is found without violation of privacy that the vehicle snaking for example at the intersection number 3 moved from the gate 5 of the intersection number 1 through the gate 3 of the intersection 2 to the gate 4 of the intersection number 3. The central computer 25 automatically presents the anomalous behavior corresponding to the anomalous identification code and the tracking route of the mobile unit on a display device, not shown, connected thereto.

A reference level setting section 41 has a reference level set in advance. To each anomalous identification code, a warning level is attached. If the warning level is equal to or higher than the reference level and a mobile unit having performed an anomalous behavior has a correspondence with a real identification code ID1, the warning code output section 40 searches the anomalous behavior type registration section 37 for a warning code with a key of the anomalous identification code to send the warning code and the real identification code ID1 to a road side communication apparatus 18 of FIG. 1.

The road side communication apparatus 18 has warning information in such a form as speech, sound, light, figure or sentence corresponding to each warning code, registered in advance. The road side communication apparatus 18 transmits the warning information through a road side antenna 19 to the on-vehicle communication apparatus having the real identification code ID1. The on-vehicle communication apparatus gives a warning according to the information to the crews if the received real identification code ID1 coincides with the assigned real identification code ID1.

Although a preferred embodiment of the present invention has been described, it is to be understood that the invention is not limited thereto and that various changes and modifications may be made without departing from the spirit and scope of the invention.

For example, instead of assigning the real identification code to the on-vehicle communication apparatus from a gate side, a real identification code having been assigned by an ETC card (IC card) for example may be received from an on-vehicle communication apparatus to bring the code into correspondence with the mobile unit in a picture.

The apparatus of FIG. 1 may be installed at places other than intersections, for example, temporal toll parking lots or traffic accident plagued areas.

Instead of providing the central computer 25 of FIG. 2 as a communication apparatus, communication may be performed among a plurality of automatic warning apparatuses to tracks mobile units by searching the ID0/ID1 tables or exchanging data of pairs of ID0 and ID1.

Without setting the exist slits EX1 to EX4 in a picture, disappearance of mobile units from the picture may be detected to release virtual identification codes ID2. Further, if the number of digits of virtual identification code is increased so large that recycling of the virtual identification code is not required, no release operation for the virtual identification code is required. A virtual identification code ID2 may be put equal to a real identification ID1 after ID correspondence therebetween.

Moreover, position of each entrance slit may be determined such that a real identification code is assigned or received before a mobile unit enters into the entrance slit in a picture. In this case, in response to the assignment or reception of the real identification code, this code is brought into correspondence with one end side or the other end side, which corresponds to the gate number identified by the real identification code, in the length direction of the entrance slit. If the mobile unit has been detected in the entrance slit within a predetermined time thereafter, the real identification code may be assigned to the mobile unit. In this case, a virtual identification code is assigned to the mobile unit to which no real identification code has been assigned and therefore on which an ID correspondence could not be performed. Furthermore, position of each entrance slit may be determined such that a mobile unit enters into an entrance slit in a picture when a real identification code is assigned or received. In this case, the mobile unit can be detected at the entrance slit in response to the assignment or reception of the real identification code.

Further, in a case where a mobile unit on which an imminent danger is to be imposed because of an anomalous behavior of another mobile unit (a mobile unit associated with another mobile unit displaying an anomalous behavior), for example, in a case where a succeeding vehicle is rapidly approaching the preceding vehicle, such speech information that "a succeeding vehicle is rapidly approaching" as information associated with an anomalous behavior may be transmitted to the preceding vehicle.

The tracking section 34 and the non-separated units division section 36 are not limited to the above described ones, but may be other ones as far as the purposes thereof be achieved.

Further, the present invention may be of a configuration of only FIG. 1 or the configuration of FIG. 1 without the road side communication apparatus 18, wherein a person issues a warning when the automatic warning apparatus 14 outputs the warning.

The present invention, furthermore, may be an apparatus only performing the tracking of mobile units without detecting an anomalous behavior.

What is claimed is:

1. A mobile unit identification apparatus, comprising:

an image storage device storing time series pictures taken with an electronic camera to be trained on a region including an on-road real gate; and an image processor, receiving a real identification code having been assigned to a mobile unit side communication apparatus passing through said real gate, assigning said real identification code to a mobile unit passing through a slit area by processing said time series pictures stored, said slit area corresponding to said real gate, tracking said mobile unit having been assigned said real identification code by processing said time series pictures, outputting information on said tracking.

2. An automatic warning apparatus to mobile units, comprising:

an image storage device storing time series pictures taken with an electronic camera to be trained on a region including an on-road real gate; and an image processor, receiving a real identification code having been assigned to a mobile unit side communication apparatus passing through said real gate, assigning said real identification code to a mobile unit passing through a slit area by processing said time series pictures stored, said slit area corresponding to said real gate, tracking said mobile unit having been assigned said real identification code to detect an anomalous behavior thereof by processing said time series pictures, outputting said real identification code of said mobile unit having displayed said anomalous behavior or another mobile unit associated therewith and outputting information associated with said anomalous behavior.

3. The automatic warning apparatus of claim 2, wherein said image processor assigns a virtual identification code to said mobile unit passing through said slit area by processing said time series pictures stored, and brings said real identification code into correspondence with said virtual identification code in response to said reception of said real identification code.

4. The automatic warning apparatus of claim 2, wherein said image processor, in a case where a plurality of mobile units passing through said slit area in ones of said pictures are not separated from each other, divides said non-separated mobile units to discriminate them from each other by tracking said plurality of mobile units in ones of said time serial pictures in reverse chronological order after said plurality of mobile units having been separated from each other in one of said time serial pictures, and performs said correspondence.

5. The automatic warning apparatus of claim 4, wherein said image processor divides and discriminates said non-separated mobile units included in a picture at a time (t-1) from each other on the basis of a correlation between a picture at a time t when said plurality of mobile units are separated therein and said picture at the time (t-1), said picture at times (t-1) and t being ones of said time series pictures.

6. The automatic warning apparatus of claim 2, further comprising: a gate side communication apparatus, including a gate side antenna to be installed correspondingly to said real gate, performing narrow region communication between said gate side communication apparatus and said mobile side communication apparatus to assign said real identification code to said mobile side communication apparatus or to receive said real identification code having been assigned to said mobile unit side communication apparatus, giving said real identification code to said image processor.

7. The automatic warning apparatus of claim 6, wherein said real identification code includes a road side identification code, and said gate side communication apparatus assigns said real identification code to said mobile unit side communication apparatus after receiving another real identification code having been assigned from said mobile unit side communication.

8. The automatic warning apparatus of claim 6, further comprising: a road side communication apparatus to be installed on a road side to transmit warning information to a mobile unit having said real identification code on the basis of said output of said image processor.

9. The automatic warning apparatus of claim 8, further comprising: an electronic camera to be installed on a road side to take said time series pictures with training on a region including said real gate.

10. A warning method to mobile units, comprising the steps of:

(a) performing narrow region communication with a mobile unit side communication apparatus passing through an on-road real gate either to assign a real identification code to said mobile unit side communication apparatus or to receive the real identification code having been assigned to the mobile unit side communication apparatus;

(b) taking time series pictures with an electronic camera installed on a road side with training on a region including said real gate;

(c) processing said time series pictures to assign said real identification code to a mobile unit passing through a slit area corresponding to said real gate;

(d) processing said time series pictures to track said mobile unit having been assigned said real identification code to detect an anomalous behavior thereof; and (e) transmitting warning information to the mobile unit side communication apparatus with said real identification code of said mobile unit having displayed said anomalous behavior or of another mobile unit associated therewith.

11. The warning method of claim 10, wherein in the step (c), said time series pictures is processed to assign a virtual identification code to said mobile unit passing through said slit area, and said real identification code is brought into correspondence with said virtual identification code in response to said assignment or reception of said real identification code.

12. The warning method of claim 10, wherein in the step (d), said anomalous behavior is detected on the basis of a similarity to each of anomalous behaviors assumed in advance, warning level being set to each anomalous behavior in advance, wherein in the step (e), said warning information is transmitted only when the warning level is equal to or higher than a reference value.

13. The warning method of claim 10, wherein the steps (a) through (e) are performed at each of said intersections, wherein in the step (a), in regard to each intersection, said real identification code includes a intersection identification code and said real identification code is assigned to said mobile unit side communication apparatus after receiving another real identification code having been assigned form said mobile unit said communication apparatus, said method further comprising the step of: (f) gathering sets each having said assigned and received real identification codes, said sets being associated with each other among said plurality of intersections, to track a mobile unit having displayed an anomalous behavior.

14. A warning method to mobile units, comprising the steps of:

(a) performing narrow region communication with a mobile unit side communication apparatus passing through an on-road real gate to assign a real identification code to said mobile unit side communication apparatus after receiving another real identification code having been assigned to the mobile unit side communication apparatus;

(b) taking time series pictures with an electronic camera installed on a road side with training on a region including said real gate;

(c) processing said time series pictures to assign said real identification code to a mobile unit passing through a slit area corresponding to said real gate; and (d) processing said time series pictures to track said mobile unit having been assigned said real identification code to detect an anomalous behavior thereof;

wherein the steps (a) through (d) are executed at each of a plurality of road sides, said method further comprising the step of:

(e) gathering sets each having said assigned and received real identification codes, said sets being associated with each other among said plurality of road sides, to track a mobile unit having displayed an anomalous behavior.

15. The warning method of claim 14, wherein in the step (c), in a case where a plurality of mobile units passing through said slit area in ones of said pictures are not separated from each other, said correspondence is performed by dividing said non-separated mobile units to discriminate them from each other on the basis of tracking said plurality of mobile units in ones of said time serial pictures in reverse chronological order after said plurality of mobile units having been separated from each other in one of said time serial pictures.

16. The warning method of claim 15, wherein in the step (c), said non-separated mobile units included in a picture at a time (t-1) is divided and discriminated from each other on the basis of a correlation between a picture at a time t when said plurality of mobile units are separated therein and said picture at the time (t-1), said pictures at times (t-1) and t being ones of said time series pictures.

* * * * *